United States Patent [19]

Parrish

[11] 4,030,658

[45] June 21, 1977

[54] FRICTION OR INERTIA WELDING APPARATUS

[76] Inventor: Thomas D. Parrish, 4504 Cedardale Lane, Flushing, Mich. 48433

[22] Filed: Aug. 5, 1976

[21] Appl. No.: 711,734

[52] U.S. Cl. .................................. 228/2; 156/73.5
[51] Int. Cl.² ........................................ B23K 27/00
[58] Field of Search ............... 228/2, 112; 156/73.5

[56] References Cited

UNITED STATES PATENTS

| | | | |
|---|---|---|---|
| 3,753,820 | 8/1973 | Ishikawa et al. | 228/2 |
| 3,954,215 | 5/1976 | Takagi et al. | 228/2 |

Primary Examiner—Al Lawrence Smith
Assistant Examiner—Robert C. Watson
Attorney, Agent, or Firm—Learman & McCulloch

[57] ABSTRACT

Apparatus adapted for performing either friction or inertia welds comprises a rotary holder for holding one workpiece to be welded and a non-rotary holder for holding a second workpiece that is to be welded to the first workpiece, the two workpiece holders being relatively movable to enable the workpieces to be forced into engagement with one another. The rotary workpiece holder is driven by means of a driving motor through the intermediary of drive transmitting means comprising a torque converter, a flywheel, a variable transmission, a clutch, and a brake. The flywheel is interposed between the torque converter and the transmission and upstream of the clutch, thereby enabling only so much of the flywheel's energy to be utilized as may be necessary to effect the weld, following which the clutch may be disengaged, thereby permitting the driving motor and the torque converter to replenish the flywheel's energy during removal of the welded workpieces from their respective holders.

7 Claims, 1 Drawing Figure

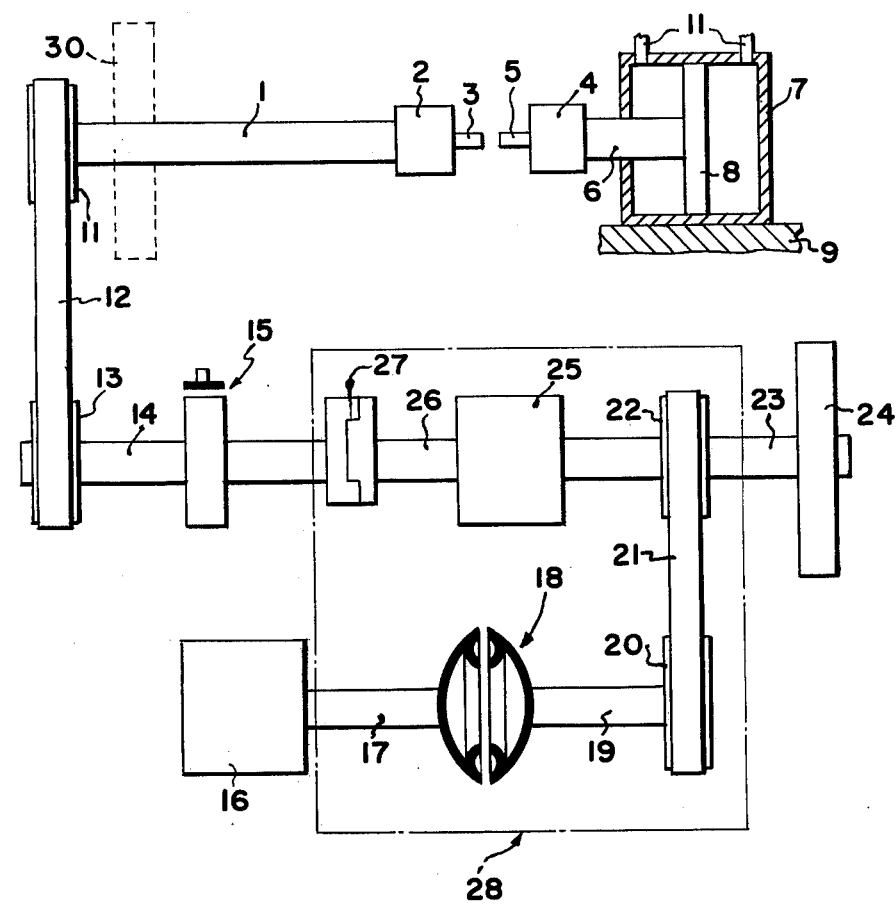

FRICTION OR INERTIA WELDING APPARATUS

The invention disclosed herein relates to welding apparatus which is usable either in friction or inertia welding machinery. In a conventional friction welder a rotatable spindle having a workpiece chuck or holder is driven by a motor through an electric clutch-brake unit to rotate the workpiece at a predetermined speed. At a predetermined time, a second workpiece holder containing a non-rotatable workpiece is actuated to force the two workpieces together for a predetermined period of time, following which the clutch is disengaged, the brake is applied, and the workpiece holders are forced together under a greater pressure to provide a forge-type weld of the two workpieces. Subsequently, the forging pressure is released and the weld is complete.

The inertia welder differs from a friction welder primarily in that the inertia welder utilizes a flywheel mounted on the rotary workpiece spindle so as to store the amount of energy required for one welding cycle. In its operation, the inertia welder utilizes a hydraulic pump to supply as many as four hydraulic motors that are coupled to the spindle. Initially, all of the motors are coupled to the spindle to provide maximum torque to accelerate the spindle and its associated flywheel. As the spindle accelerates, a control mechanism uncouples one motor at a time from the spindle. At full speed all motors are uncoupled and at that time a single forging pressure is applied to the workpieces to form the weld. During the welding phase, the flywheel energy is utilized to generate the welding temperature, thereby effecting deceleration of the spindle. As the spindle slows to the point where the weld sets, any remaining energy is absorbed by the welded workpieces.

Each of the friction and inertia welding processes referred to above produces good welds, but have certain disadvantages. For example, a typical friction welder has its flywheel coupled directly to the driving motor, thereby imposing substantial strain on the motor during starting rotation of the flywheel and replenishing its energy following the making of a weld. In a typical inertia welder, the multiple motors utilized to drive the flywheel relieve strain on the driving motor, but the use of multiple motors and their associated control mechanisms represents substantial expense. In addition, the necessity of restarting the flywheel after each operation of the inertia welder requires a substantial amount of time, thereby restricting the number of welds which can be made in a given period of time.

An object of the invention is to provide driving apparatus applicable to either inertia or friction welders and which avoids many of the disadvantages of heretofore available driving mechanisms.

Another object of the invention is to provide apparatus of the kind referred to and which utilizes conventional, readily available components, thereby enabling economies to be achieved.

Other objects and advantages of the invention will be pointed out specifically or will become apparent from the following description when it is considered in conjunction with the appended claims and the accompanying drawing which is a diagrammatic representation of apparatus included in the invention.

Apparatus constructed in accordance with the invention is especially adapted for use in conjunction with conventional friction welding apparatus typically including a rotatable spindle 1 having at one end thereof a workpiece clamping chuck 2 in which a workpiece 3 may be removably clamped. In confronting relation with the chuck 2 is a second chuck 4 in which a workpiece 5 may be removably clamped. Preferably, the chuck 4 is carried by a non-rotatable shaft 6 which extends into a fluid pressure ram 7 within which is an axially movable piston 8. The ram 7 is fixed on a suitable support 9 and has openings therein for the accommodation of fluid pressure lines 10 which may be connected, via suitable valving (not shown), to a source of pressure fluid so as to effect reciprocating movements of the piston 8 for the purpose of moving the chuck 4 toward and away from the chuck 2.

Fixed to the spindle 1 is a suitable pulley 11 around which is trained a driving belt 12 which also is trained around a pulley 13 that is fixed to a shaft 14, the arrangement being such that rotation of the shaft 14 is transmitted to the spindle 1. If desired, the shaft 14 may be provided with a brake 15 by means of which rotation of the shaft 14 and of the spindle 1 may be terminated.

The apparatus thus far described is substantially conventional and forms no part of the invention per se, aside from the manner in which it cooperates with apparatus yet to be described.

Apparatus constructed in accordance with the invention relates to drive transmitting mechanism by means of which the spindle 1 and the workpiece 3 may be driven rotationally. The driving apparatus comprises an electric or other suitable driving motor 16 having its output shaft 17 coupled via drive transmitting means to the spindle 1. The drive transmitting means includes the aforementioned members 11–14 and additional apparatus including a torque converter 18 coupled to the shaft 17. The torque converter is coupled to a shaft 19 to which is fixed a pulley 20 around which is trained a driving belt 21. The belt 21 also is trained around a pulley 22 that is fixed to a flywheel shaft 23 at the free end of which is secured a flywheel 24.

The flywheel shaft 23 is coupled to the input side of a variable speed gear transmission 25, the output side of which is coupled by a shaft 26 to the shaft 14 via a clutch 27. The torque converter 18, the members 19–23, and the members 25–27 need not necessarily comprise separate units, but instead can constitute assembly incorporated in a readily available vehicle drive transmission as that included in 1976 model Cadillac Eldorado and Oldsmobile Toronado vehicles, such transmissions being fully disclosed in the appropriate manuals published by General Motors Corporation. Such transmission is indicated in the drawing by the reference character 28. If the transmission 28 constitutes the Cadillac Eldorado transmission, substantially the only modification that needs to be made to the transmission is the mounting of the flywheel 24 on the shaft 23.

To condition the apparatus for operation, workpieces 3 and 5 are mounted in their respective chucks 2 and 4 with the workpieces confronting, but being spaced from, one another. The drive motor 16 is started so as to effect rotation of the shaft 14 via the transmission 28 and rotation of the spindle 1 via the drive transmitting belt 12. When the spindle 1 reaches the prescribed speed of rotation, the shaft 6 is displaced to the left, as viewed in the drawing, to effect engagement between the workpieces 3 and 5. Since the workpiece 5 does not rotate, engagement between the workpieces produces friction which generates sufficient heat to render the metal of the workpieces plastic at their interface. After a prescribed period of time, the clutch 27 is disengaged, thereby uncoupling the spindle 1 from the drive transmitting apparatus, whereupon the ram is actuated to apply forging pressure on the workpieces. Following uncoupling of the spindle from its drive transmitting apparatus, the speed of rotation of the spindle diminishes and may be terminated either by application of the brake 15 or by the resistance to rotation offered by the solidification of the metal at the interface of the workpieces 3 and 5.

A particularly advantageous characteristic of the disclosed construction is that the torque converter 18 is interposed between the drive motor 16 and the flywheel 24. This arrangement makes it possible for energy absorbed from the flywheel during the welding process to be restored by the drive motor 16 during the time that the clutch 27 is disengaged and the welded workpieces are replaced by others that are to be welded.

Another important characteristic of the disclosed construction is that the variable speed transmission 25 is interposed between the flywheel 24 and the spindle 1. In this arrangement the flywheel may be driven at its designed speed irrespective of the fact that the maximum speed of rotation of the spindle 1 often must differ in welding workpieces of different size.

The use of a torque converter has the advantage of minimizing the load imposed on the driving motor 16 during starting of the rotation of the flywheel 24 and during the energy drain of the flywheel, as well as during the time that is required to restore the flywheel to its prescribed speed of rotation following the welding operation. As a result, the driving motor 16 may be of lesser capacity, and consequently less expensive, than motors used heretofore for equal welding performance.

In addition to the foregoing, the utilization of a standard automotive transmission of the kind referred to as part of the drive transmitting mechanism provides a relatively inexpensive, mass produced assembly which has ample capacity for welding operations and which is readily available.

Driving apparatus as disclosed is applicable to inertia welding machinery, as well as to the friction welding machinery described herein. The apparatus disclosed in the drawing may be converted from a friction welder to an inertia welder merely by mounting a flywheel 30 (shown in dotted lines) on the spindle 1, and dispensing with the brake 15. In either case, the novel driving mechanism remains the same.

The disclosed embodiment is representative of a presently preferred form of the invention, but is intended to be illustrative rather than definitive thereof. The invention is defined in the claims.

I claim:

1. Apparatus for welding workpieces comprising means for holding a first workpiece; means for holding a second workpiece in confronting engagement with said first workpiece; means mounting one of said holding means for rotation relative to the other; driving means; and drive transmitting means interconnecting said driving means and said one of said holding means, said drive transmitting means including a flywheel, torque converter means interposed between said flywheel and said driving means, and clutch means interposed between said flywheel and said one of said holding means for selectively engaging and disengaging said driving means with and from said one of said holding means.

2. Apparatus according to claim 1 including brake means interposed between said clutch means and said one of said holding means.

3. Apparatus according to claim 1 wherein said drive transmitting means includes variable speed transmission means.

4. Apparatus acording to claim 3 wherein said variable speed transmission means is interposed between said flywheel and said clutch means.

5. Apparatus according to claim 1 wherein said torque converter means is fluid operated.

6. Apparatus according to claim 1 including means for effecting relative movement of said workpiece holding means toward and away from one another.

7. Apparatus according to claim 1 wherein a second flywheel is mounted on the rotatable one of said holding means.

* * * * *